United States Patent [19]
Hamlin et al.

[11] Patent Number: 4,542,805
[45] Date of Patent: Sep. 24, 1985

[54] AUTOMATICALLY RETRACTABLE, ROTATABLE STEP ASSEMBLY

[76] Inventors: David A. Hamlin, 2922 - 314th SW., Federal Way, Wash. 98023; Melvin L. Glover, 24427 - 11th Ave. S., Kent, Wash. 98032

[21] Appl. No.: 637,560

[22] Filed: Aug. 3, 1984

[51] Int. Cl.[4] .......................... E06C 9/04; E06C 7/08; B60R 3/02

[52] U.S. Cl. ...................................... 182/91; 182/100; 182/189

[58] Field of Search ................... 182/91, 100, 189, 89, 182/146, 209; 248/293, 240.4, 218.4, 219.3

[56] References Cited

U.S. PATENT DOCUMENTS

| | | | |
|---|---|---|---|
| 438,036 | 10/1890 | Verstraete | 182/189 |
| 1,090,852 | 3/1914 | Hieronymus | 182/91 |
| 1,852,430 | 5/1932 | Newcastle | 182/89 |
| 2,678,832 | 5/1954 | Wright | 182/91 |
| 3,019,851 | 2/1962 | Doss | 182/189 |
| 3,259,209 | 7/1966 | Brown | 182/189 |
| 3,986,503 | 10/1976 | Le Guillon | 182/89 |
| 4,029,355 | 6/1977 | Wilhelmsen | 182/91 |
| 4,132,288 | 2/1979 | Bingham | 182/91 |
| 4,402,385 | 9/1983 | Buche | 182/91 |
| 4,432,436 | 2/1984 | Suiter | 182/91 |

*Primary Examiner*—Reinaldo P. Machado
*Attorney, Agent, or Firm*—Roy E. Mattern, Jr.

[57] ABSTRACT

An automatically retractable pivotal step assembly is used on scaffolding and storage structures, particularly in a warehouse environment. The automatic retractability feature is particularly important in keeping the step assembly from being struck and broken off by loading equipment, or causing injury to workers or damage to material being transported by loading equipment.

The step assembly is pivotally secured to a stanchion member of the storage rack structure at a selected height to permit a warehouse worker to ascend to a second or higher level of the storage structure and then be automatically returned and stored in a retracted position behind the stanchion member when not being used. Several step assemblies may be vertically aligned on the stanchion in combination at increasing heights to permit access to multiple levels of the structure.

17 Claims, 7 Drawing Figures

AUTOMATICALLY RETRACTABLE, ROTATABLE STEP ASSEMBLY

BACKGROUND

In recent years there have been developments to provide adjustable step devices as well as steps which are retractable when not in use. Most of these inventions are somewhat mechanically complex or require the user to manually return the step to its stored position.

Le Guillon, U.S. Pat. No. 3,986,503, 1976, provides a mounting means for machines comprising a bracket and step assembly. The pivotal bracket may be lowered to a secured horizontal position and by manually disengaging the locking means, the bracket will return via a spring, to its vertical stored position.

William Bingham, U.S. Pat. No. 4,132,288, 1979, has developed a ladder with retractable rungs. A plurality of rungs may be hingedly secured to a central stem which is secured within an elongated housing.

A most recent development has been that of Peter Buche, U.S. Pat. No. 4,402,385, 1983. Buche has developed a folding step which uses a mounting plate and elongated step member. The step member is manually raised from its operative horizontal position and secured within the bracket member in a relatively vertical position when not in use. Cooperating means are provided on the mounting plate and step member to store the step member and keep it from passing through the opening or recess in the mounting plate while being stored.

A major disadvantage of these inventions is that when not in use, the steps will not be automatically retracted or stored in a recessed position from their mounting means. In warehouses and other industrial sites, for example, machinery and vehicles are often traveling back and forth proximate to structures which may utilize folding and retractable step devices. This is particularly true in a warehouse where front loaders and fork lift trucks are traveling in the aisles between large storage racks or scaffolding structures. With a load partially obstructing his view, the vehicle operator will often not see the step member projecting into the aisle way or roadway space of the vehicle. Consequently, an unattended step device left in an extended or horizontal position is often struck and broken off by the loading vehicle.

A projecting step device which is not being used can also provide a dangerous obstacle to workers passing by who might not see the step while carrying a load for example.

An object of the present invention is to provide an automatically retractable step assembly which will store the extended projection in a recessed position behind its mounting means to prevent the step from accidentally being sheared off by passing vehicles and prevent injuries to passing pedestrians. A further object of the present invention is to provide a step assembly which uses a minimum of components and requires virtually no maintenance with regard to parts which may need to be replaced in order to provide its automatic retractability. It is a further object of the present invention to provide several embodiments of the invention so as to permit some flexibility in adapting the step assembly to various sized and shaped mounting structures.

SUMMARY OF THE INVENTION

An automatically retractable rotatable step assembly to be used on storage rack structures, such as in a warehouse, to provide access to the upper levels of the storage structures. The step assembly may be pivotally secured to a stanchion member of the storage rack structure. The step assembly is rotated downwardly to a substantially horizontal location while in its active position and when not in use the step assembly is automatically returned to and stored in a substantially vertical position in alignment with the stanchion and clearing the front edge of the stanchion.

The primary embodiment of the step assembly is comprised of a pair of elongated arms, a cross member brace and a means for automatic retractability. The elongated arms are spaced apart in parallel alignment to each other and are pivotally secured to opposite sides of a stanchion member by a bolt which laterally extends through centrally located and aligned concentric apertures in the stanchion member and through each elongated arm. A cross member brace is perpendicularly positioned to and secured horizontally between the elongated arms, being positioned along the arms rearward of the pivotal connecting hinge.

From their relatively upright, stored and inactive position, the elongated arms are rotatably pivoted downwardly an arcuate distance of preferably slightly less than 90 degrees at which point the cross member brace supportively abuts the back side of the stanchion to effectively stop further rotation of the step assembly and provide support for the foot contacting portion of the elongated arms during use. The cross member brace is also the preferred means for automatic retractability of the step assembly. The off center weight distribution of the cross member brace serves to automatically rotate the rearward counter-weight portion of the elongated arms downwardly while the foot contacting portion is thus being rotated upwardly. Upon completing return rotation, the elongated arms become vertically aligned with the stanchion member while the step assembly is in the inactive and stored position.

DESCRIPTION OF THE PREFERRED EMBODIMENTS

Introduction

Figure 1:
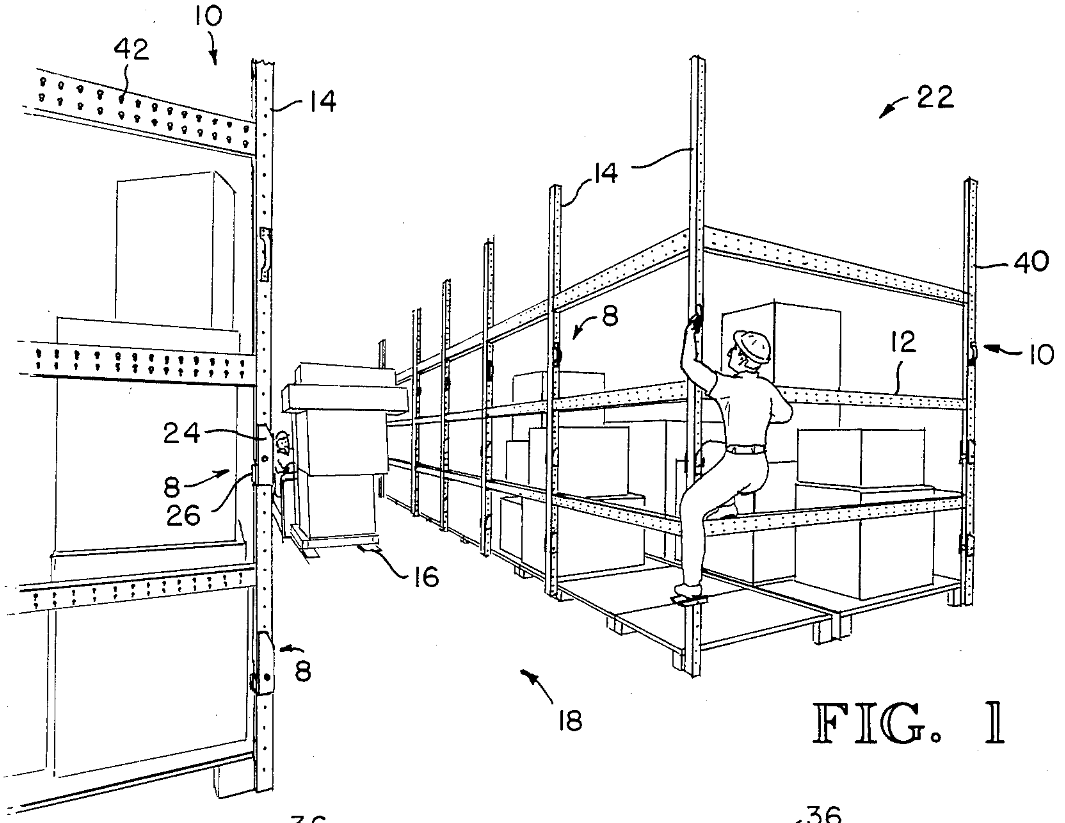
FIG. 1 of the drawing illustrates a typical warehouse facility utilizing storage racks with the step assembly in accordance with the present invention.

An automatically retractable rotatable step assembly 8 is used on storage racks, scaffolding or with a variety of other structures requiring accessability to a second or higher level of the structure. A primary use of the step assembly 8 is with warehouse storage rack structures 10, permitting the warehouseman, for example, to quickly ascend to the second level of the storage rack structure 10 or storage rack 10 to load or unload inventory as shown in FIG. 1. In such usages, it is particularly important that the step assembly 8 be stored in a retracted position, out of the path of warehouse loading equipment and machinery such as fork lift trucks 16, as well as from a safety standpoint to prevent injury to workers, when not in use. While traveling in the aisles, these loading vehicles frequently run into and break off steps which are left extending into the aisle way 18 during nonuse causing damage to the equipment, containers and/or contents of the containers.

In this regard, the preferred embodiment of the step assembly 8 is pivotally secured in a substantially vertical position to an upright support member 14 or stanchion 14 of the storage rack 10 during nonuse. The step assembly 8 is rotated downwardly, manually or with the worker's foot as he or she climbs onto the step, to then extend perpendicularly to and into the aisle way 18 while in use. When the worker climbs off of the step assembly, 8 it will automatically retract and rotatably return to and be stored in its relatively vertical alignment with the stanchion, 14 clearing the front edge 20 of the stanchion and thus clear the aisle way 18 during nonuse.

FIG. 1 of the drawings illustrates a typical warehouse facility 22 utilizing multiple story, storage rack structures 10 separated by aisle ways 18 to provide access to both sides of the rack structures 10. The step assembly 8 is pivotally secured to the upright supports 14 or stanchions 14 of the storage rack 10 at a pre-selected height and spaced apart along the length of the structure 10. Several step assemblies 8 may be vertically aligned on the stanchion 14 at increasing heights to permit access to a higher level of the storage rack 10.

Various other usages for the step assembly 8 can be found in climbing situations when potential injury to the workers could result or damage would result to the step or transported inventory from the step being left protruding from its support means during nonuse.

The step assembly 8 comprises essential components in a preferred embodiment of a pair of elongated arms 24, a cross member brace 26 and a means for automatic retraction of the step assembly 8 during nonuse. Various other embodiments of the step assembly 8 are adapted for use with a particular size or shape of storage racking 10. Lengths of the elongated arms 24 as well as configuration in location of the cross member brace 26 will vary according to the specific type of racking used. Several preferred embodiments are described in more detail below.

The Elongated Arms of the Step Assembly

Figure 2:
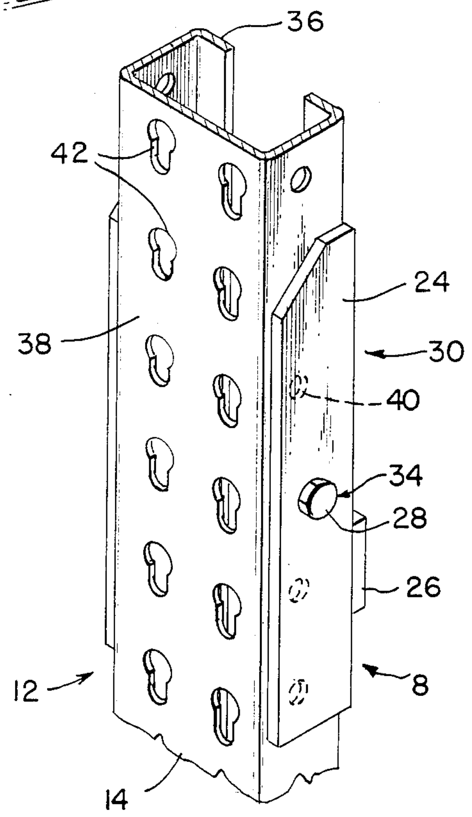
FIG. 2 shows the step of the present invention in folded condition.
Figure 3:
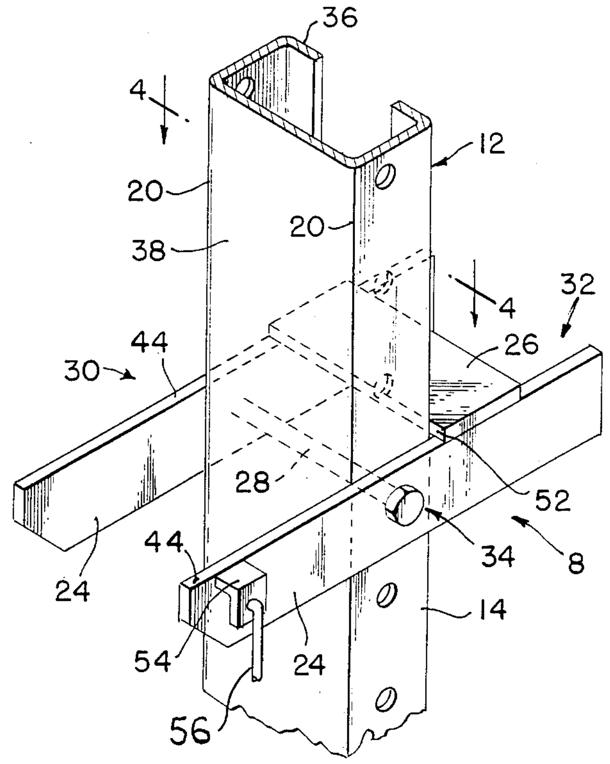
FIG. 3 shows the same step in operative position.
Figure 4:
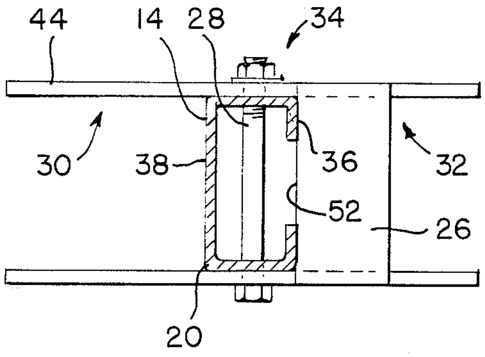
FIG. 4 is a cross sectional view taken on the line 4—4 of FIG. 3.

As shown in FIGS. 1 through 4, the preferred embodiment of the step assembly 8 includes a pair of spaced apart, parallel, elongated arms 24. Each elongated arm 24 is pivotally secured to an opposite side of the stanchion 14 of the storage rack by a shaft or bolt 28 which extends laterally through aligned apertures 40 in opposite sides of the stanchion 14 and through concentric, aligned apertures 40 in each of the elongated arms 24 as shown in FIGS. 3 and 4.

Preferably made of flat narrow strips of high strength steel, each elongated arm 24 further comprises a foot contacting portion 30 proximate its forward end, and a counterweight portion, 32 at the rearward end.

As the forward ends of the elongated arms 24 are rotated downwardly to their active, substantially horizontal position, the foot contacting portion 32 extends forward of the stanchion 14 while the counterweight portion 32 extends rearwardly from the stanchion 14 as shown in FIGS. 3 through 7.

Each elongated arm 24 preferably has a tapered front end, having the sharp bottom corner removed, to prevent potential injuries which could result from contact with these sharp corners or edges on the arms.

Figure 6:
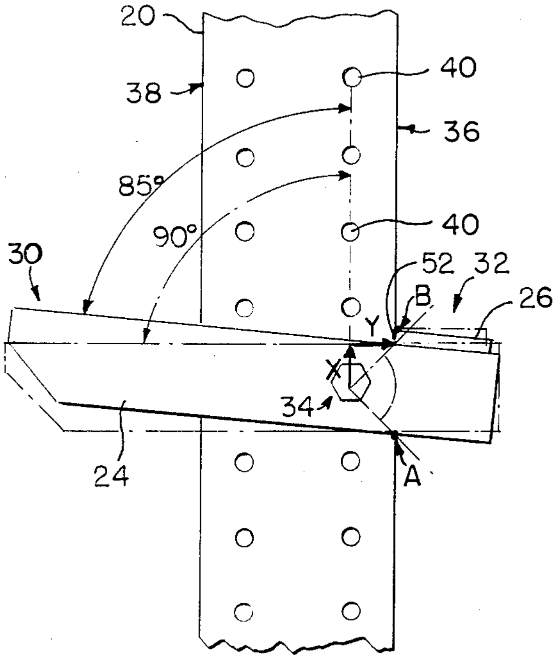

As shown in FIG. 6, the step assembly 8 is pivotally adapted to rotate preferably slightly less than ninety degrees between the upright storage position and the extended substantially horizontal position before being effectively stopped by the cross member brace 26, thereby reducing the risks of the worker slipping off the foot contacting portion 30.

The Cross Member Brace of the Automatically Retractable Rotatable Step Assembly

The cross member brace 26 is perpendicularly positioned on and secured to each of the elongated arms 24 proximate the counterweight portion 32 as shown in FIGS. 3 through 7. In a first embodiment of the step assembly 8 as shown in FIGS. 2 through 6 of the drawings, the cross member brace 26 is a substantially flat bar secured to the top edge surfaces 44 of each elongated arm 24.

The cross member brace 26 is adaptively positioned rearward of the pivotal connecting hinge 34 of the arms 24 to the stanchion 14. The particular location of the cross member brace 26 longitudinally along the arms 24, between the rearward end and the pivotal connecting hinge 34 may vary according to the various embodiments and overall lengths of the elongated arms 24.

To activate the step assembly 8, the worker manually folds the step assembly 8 down from the stanchion 14 by hand or with the toe of his boot, for example. As the elongated arms 24 are pivotally rotated from their relatively vertical inactive stored position, the foot contacting portion 30 is rotated downwardly while the counterweight portion 32 rotates upwardly about the axis of the connecting hinge 34. When the elongated arms 24 have become fully extended, the cross member 26 brace contacts and supportively abuts the back side 36 of the stanchion 14 thereby stopping the pivoting and firmly positioning the foot contacting portion 30 in its use position supporting a foot of a warehouse person.

In the primary embodiment, the cross member brace 26, as well as the counterweight or rearward portion of the elongated arms, provides the counterweighing means for automatic retractability of the step assembly 8. The off center weight distribution of the cross member brace 26 of the step assembly 8 causes automatic downward rotation of the counterweight portion 32 after the worker climbs off of the step assembly 8. The elongated arms 24 then return to and are stored in relatively vertical alignment with the stanchion 14, clearing the front edge 20 of the stanchion 14, and clearing the aisle out of the path of a loaded forklift. truck, during nonuse as shown in FIG. 2 of the drawing.

Alternative means for automatic retractability could be used, such as springs attached to the stanchion 14 and the elongated arms 24 for example. Other mechanical linkages could be used as well. These methods appear to be less desirable because of the additional service and maintenance of extra parts which is not required of the counterweighing design feature.

Pivotal Attachment of the Step Assembly to the Stanchion

The stanchions 14, or upright structural support members are comprised of sections of stroage racking 12 which are typically hollow and rectangularly shaped, often having one side partially open. Light duty racking 12 comes in two inch by four inch size members while a more heavy duty storage racking is manufactured in four inch by four inch sizes. Many other types of commercial racking of various sizes and shapes are available, including three inch by three inch, while some racking is four sided. The step assembly is adapted to be used with any of this racking requiring lengthening or shortening of the elongated arms as required.

As shown in the drawings, the storage racking 10 comprising the stanchions 14 is typically manufactured with pairs of horizontally aligned, concentric apertures 40 which extend through the opposite sides of the stanchion 14. These pairs of existing apertures 40 are spaced apart vertically along the entire length of the stanchions 14 and are adaptably used for pivotal connection of the step assembly 8 at variable and selected heights as well as to permit connection of other storage racking structural members to the stanchions 14. In some embodiments, the sides of the storage racking 12 may also have pairs of enlarged slotted apertures 42, spaced apart to facilitate structural and accessory attachment to the stanchion 14 as well as shown in FIGS. 1 and 2. In the preferred embodiment, the back side of the stanchion 14 is partially open, as shown in FIGS. 2 through 4.

The stanchions 14 of the storage rack 10 are generally aligned such that the front side 38 faces outwardly from the structure 10 toward the aisle ways 18. The step assemblies 8 are thus adaptively secured to the stanchions 14 so as to be rotated perpendicularly to and extend into the aisle way 18 during use. A less desirable alternative assembly would have the step assembly 8 positioned ninety degrees to the side to be adaptively secured to the stanchion 14 so as to rotate in longitudinal alignment with the aisle way 18. As inventory is often stored adjacent to the edge of the stroage structure at the aisle, rotation of the step assembly in this alternative position would be restricted.

The Specific Configuration of the Elongated Arms and Cross Member Brace Determine the Point of Pivotal Connection as Well as the Selected Location of the Step Assembly on the Stanchion Member The primary embodiments of the arms 24 shown in the drawing are sized to fit within the short side dimensions of a two by four inch stanchion 14 of the storage racking 12. This light duty racking is shown in FIGS. 2, 3 and 4.

Figure 5:
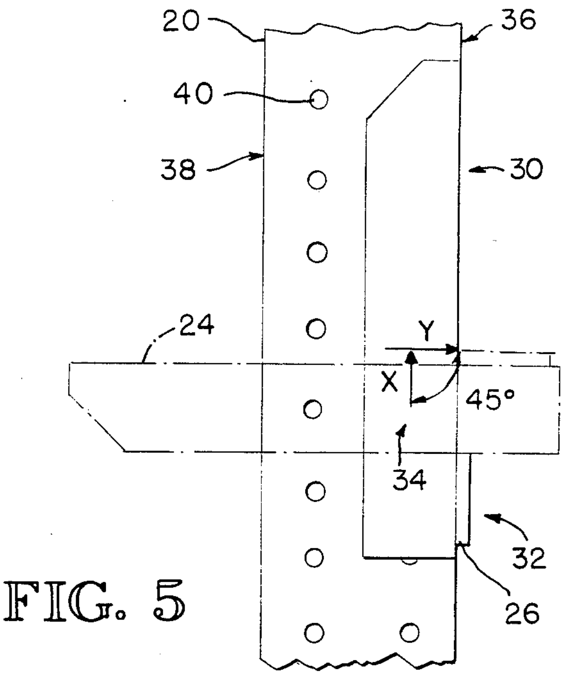
FIGS. 5–7 show further modifications of the step and support member.

FIGS. 5 and 6 illustrate the elongated arms 24 being located adjacent to the back side of the larger four inch by four inch stanchion 14 with the top edge surface 44 of the arms 24 being aligned with the back side 36 when the step assembly 8 is in the inactive upright position. As the larger storage racking 12 will often have several vertical columns of apertures 40 through each side, the step assembly 8 will be pivotally mounted at the rear column of apertures in this embodiment. A bolt 28 which pivotally connects the step assembly 8 to the stanchion 14, is substantially centrally located through each elongated arm 24, being approximately equidistant between each end of the arm and providing the pivotal connecting hinge 34. Other size elongated arms 24 may be used with other sizes and configurations of racking stanchions 14.

Figure 7:
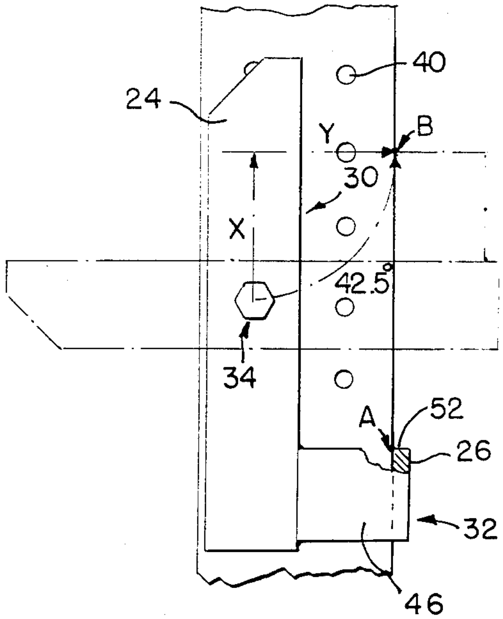

It is important that the pivotal connecting hinge 34 be located sufficiently behind the front side 38 of the stanchion 14 so as to permit the elongated arms 24 to clear the front side 38 when they are retracted to be stored in their inactive position and importantly thereby be cleared of the aisle. The length of the portion of the elongated arms 24 forward of the connecting hinge 34 must also be greater when the step assembly 8 is secured to the larger four by four inch stanchion 14 so as to provide an adequate foot contacting portion 30 as sufficient support for the worker when the step assembly 8 is being used and fully extended in the active position.

Where the embodiments of the step assembly 8 are mounted adjacent to the back side of the stanchion 14, including the light duty two inch by four inch racking stanchions 14, the cross member brace 26 is comprised of a flat bar, secured to the top edge surface 44 of each elongated arm 24 as shown in FIGS. 1 through 6. Other selected embodiments of the step assembly 8, shown in FIG. 7, are adaptively secured to the stanchion 14 within the forwardly located columns of apertures 40. In the other embodiments, the cross member brace 26 comprises a C-shaped bracket and includes side extensions 46 and extends above the elongated arms 24 to permit additional rotation of the step assembly 8.

As the pivotal connecting hinge 34 is moved forward of the back side 36 of the stanchion 14, the side extensions 46 of the cross member brace 26 will be lengthened proportionally.

A step assembly 8 will rotatably pivot roughly 90 degrees between the substantially upright stored and inactive position to the fully extended and substantially horizontal active position. The cross member brace 26 is secured to the elongated arms 24 so as to effectively abut the back side 36 of the stanchion 14 at a first lower position A when the elongated arms 24 are in their inactive location and then come into effective communicating abutment with the back side 36 of the stanchion 14 at a second upper position 13 as the elongated arms 24 become fully extended to their active location as shown in FIGS. 2 through 7.

The elongated arms 24, when in a fully extended active location will preferably establish the foot contacting portion 30 at a slightly elevated angle. In this regard, the elongated arms 24 will travel between 85 to 88 degrees or slightly less than a 90 degree radial arc which would position the arms horizontally. In this position an inward sloping angle of the arms 24 provides additional safety for the worker when standing on the foot contacting portion 30. This will reduce the chances of the worker slipping off the step assembly 8 when his boot is wet and slippery for example.

In determining the spaced location of the pivotal hinge and cross member brace 26 longitudinally along the elongated arms 24, the several preferred embodiments may vary in size and dimension in this regard so long as the step assembly 8 is permitted to rotate approximately 90 degrees and clear the front edge of the stanchion 14 while being stored.

As viewed in FIG. 6 of the drawings, the angle formed between the first lower abutment contact point A on the stanchion 14, the pivotal connecting hinge 34, and the second upper abutment contact point B on the stanchion 14 will be equal to the rotational arc of travel of the arms 24, or preferably slightly less than 90 degrees.

A simplified illustration of this relationship is shown in FIGS. 5 through 7 wherein distancy Y is slightly less than distance X.

Additional Features and Considerations for the Various Embodiments of the Step Assembly In several embodiments of the step assembly 8 the counterweight portion of the elongated arms 24 will extend rearward of the cross member brace 26 such as in FIGS. 2 through 7. In one alternative embodiment, the ends of the counterweight portion 32 will be extended to provide additional off center counterweight for the elongated arms 24 as shown in FIGS. 5 through 7.

To provide additional safety, the top edge surfaces 44 of the foot contacting portion 30 may be serrated or covered with a non-skid material such as rubber.

To facilitate initial operation and rotation of the step assembly 8, a small tab 54 may be secured to the outside of an elongated arm 24 near the front end as shown in FIG. 3. The step assembly 8 may then be lowered into its active position by the worker by pressing downward on the tab 54 using his foot rather than maneuvering it by hand.

As discussed earlier, the primary embodiment of the invention incorporates the use of a single step assembly secured to a stanchion to permit access to a second level of the storage rack 10 structure. It is anticipated that a worker may have difficulty activating additional step assemblies above the second level while trying to climb up and down the storage rack 10, with a load of boxes for example.

To provide for additional step assemblies 8 to be used in combination with each other on a single stanchion, an additional linking mechanism may be used to connect several sets of elongated arms 24 as shown in FIG. 1. A connecting wire 56 may be secured to an elongated arm 24 in each of two step assemblies 8 which are vertically spaced apart on a stanchion 14. When the lower step assembly 8 is activated, the connecting wire 56 will automatically activate the upper step assembly 8, thereby permitting the worker to step up without the additional difficulty of manually activating the second step assembly 8. The connecting wire 56 will permit the step assemblies 8 to automatically retract to the stored position when the worker has climbed off of the lower assembly 8.

It is claimed:

1. An automatically retractable, rotatable step used with storage racking, to provide access to the upper levels of said racking, and which is adaptively secured to a stanchion of said racking to support a foot of a person after being activated to a position substantially normal to said stanchion and which is then automatically retracted and returned to and stored, after being inactivated and the foot removed, in a substantially upright position, immediately adjacent to and clearing the front edge of the stanchion to thereby clear aisle way space adjacent to the storage rack, and which comprises:

(a) a pivotal support member secured to the stanchion; and (b) a cross member brace, perpendicularly secured to the pivotal support member and adaptively positioned along said support member rearward of the stanchion and which is further adapted to supportively abut the back side of the stanchion thereby restricting further downward pivotal rotation of said support member, when the step is fully activated; and (c) a means to automatically retract the step after being inactivated which is secured to the pivotal support member.

2. An automatically retractable rotatable step as defined in claim 1 wherein the pivotal support member further comprises a pair of spaced apart, parallel elongated arms in coplanar alignment which are pivotally secured to opposite sides of the stanchion whereby said arms, being stored in an upright position, are axially rotated downwardly substantially through 90 degrees prior to being effectively and restrictively stopped, extending from the stanchion substantially horizontally while being fully activated to now support a person's weight and which then are automatically retracted to the stored upright position, being substantially vertical and in alignment with and clearing the front edge of the stanchion, said arms having now been fully inactivated.

3. An automatically retractable rotatable step as defined in claim 2 wherein the cross member brace adapted on said arms to be located behind the stanchion to supportively abut the back of the stanchion to effectively stop further pivotal rotation of the elongated arms at the substantially horizontal fully activated position.

4. An automatically retractable rotatable step as defined in claim 3 wherein the counterweighing means comprises the cross member brace wherein said cross member brace is located along said arms rearwardly of the pivotal connection to the stanchion member.

5. An automatically retractable rotatable step as defined in claim 4 wherein the cross member brace supportively abuts the backside of the stanchion at a first lower location, thereby restricting further upward rotation of the elongated arms while the step is in the substantially vertical, inactive, stored position, whereas said cross member brace supportively abuts the backside of the stanchion at a second upper location, while a load is supplied to and maintained on the foot contacting portion of said elongated arms to rotate said arms to the substantially horizontal active position, thereby further restricting further downward rotation of said elongated arms.

6. An automatically retractable, rotatable step as defined in claim 5 whereby the off center counterweight distribution of said cross member brace on the elongated arms automatically pivotally retract said elongated arms, when the load is removed, clearing the front side of the stanchion to finally return to the stored, substantially vertical position.

7. An automatically retractable step as defined in claim 6 wherein the elongated arms are supportively retained on a slight incline in the fully extended active position to adapt the foot contacting portion of the step to an inward sloping angle.

8. An automatically retractable rotatable step assembly, pivotally secured to a storage racking stanchion member to provide access to the upper levels of the storage rack, being manually rotated substantially through 90 degrees before being effectively stopped at a substantially horizontal, active position while said step assembly is then automatically and rotatably retracted to and stored in a substantially vertical inactive position, said step comprising:

(a) a pair of elongated arms, spaced apart on and connected to opposite sides of the racking stanchion member and having a foot contacting portion at the front end and a counterweight portion at the back end of said arms and;

(b) a cross member brace connected to the elongated arms rearward of their pivotal attachment to the stanchion member, and which is adaptively positioned to supportively abut the back side of the stanchion member at a first lower location when the elongated arms are substantially upright in the stored, inactive position, behind the front side of the stanchion member, thereby preventing further upward rotation of said arms, and to alternately supportively abut the back side of said stanchion member at a second upper location when the elongated arms have been rotatably extended to a substantially horizontal active position, said cross member brace thereby preventing further downward rotation of the elongated arms; and (c) a pivotal connecting hinge, insertably secured through concentric apertures in each elongated arm and each side of the stanchion member and secured outside each elongated arm to permit pivoting of the step assembly.

9. An automatically retractable, rotatable step assembly as defined in claim 8 whereby the pivotal connecting hinge is secured through each elongated arm at a position along the longitudinal centerline of each elongated arm.

10. An automatically retractable, rotatable step assembly as defined in claim 9 wherein the elongated arms are pivotally secured to the stanchion member such that an angle formed between a pivotal connecting hinge and the leading edge of the cross member brace approximate its point of connection to the top edge surface of the elongated arm is substantially 45 degrees relative to a longitudinal centerline of said elongated arm.

11. An automatically retractable, rotatable step assembly as defined in claim 10 whereby said angle formed is greater than 45 degrees but less than 50 degrees relative to the longitudinal centerline of the elongated arm.

12. An automatically retractable rotatable step assembly as defined in claim 8 wherein the cross member brace further comprises an off center counterweight which automatically rotates and returns the step to the substantially vertical, inactive position whereby the elongated arms clear the front edge of the stanchion member.

13. An automatically retractable rotatable step assembly as defined in claim 12 wherein said cross member brace is substantially flat, positioned normally to and being essentially secured to and directly abutting the top edge surfaces of the elongated arms.

14. An automatically retractable rotatable step assembly as defined in claim 13 whereby the elongated arms are pivotally secured to the stanchion member at a location which is inset from the rear edge of said stanchion member at a distance of less than the width of one of said elongated arms whereby the top edge surfaces of the elongated arms are substantially aligned with the rear edge of the back side of the stanchion member when the step assembly is stored in the substantially vertical, inactive position.

15. An automatically retractable rotatable step assembly as defined in claim 12 wherein said cross member brace is C-shaped, being elevated from the elongated arms by side extensions and adaptively secured normally to the elongated arms to permit an increased rotational arc of travel of said arms and enable retraction to the substantially vertical position when the step assembly is pivotally secured to the stanchion member, the step member being pivotally secured to said stanchion member at a location inset from the rear edge of said stanchion member at a distance greater than the width of an elongated arm.

16. An automatically retractable rotatable step assembly as defined in claim 15, whereby the bottom edge surfaces of the elongated arms are substantially aligned with the front edge of the stanchion member when the step assembly is adaptively secured to said stanchion member in the stored, inactive position.

17. An automatically retractable rotatable step assembly as defined in claim 16 whereby a linkage means connects a plurality of vertically spaced apart step assemblies on the stanchion whereby said linkage means is connected to an elongated arm of each assembly to permit simultaneous activation and deactivation of said plurality of step assemblies.

* * * * *